US011655682B2

(12) United States Patent
Hilhorst et al.

(10) Patent No.: US 11,655,682 B2
(45) Date of Patent: May 23, 2023

(54) FLUID STORAGE AND PRODUCTION

(71) Applicant: Baker Hughes Oilfield Operations LLC, Houston, TX (US)

(72) Inventors: Oscar Hilhorst, Bergen (NL); Beau Wright, Tomball, TX (US); Antonio Di Campli, Ortona (IT)

(73) Assignee: BAKER HUGHES OILFIELD OPERATIONS LLC, Houston, TX (US)

( * ) Notice: Subject to any disclaimer, the term of this patent is extended or adjusted under 35 U.S.C. 154(b) by 0 days.

(21) Appl. No.: 17/483,236

(22) Filed: Sep. 23, 2021

(65) Prior Publication Data
US 2023/0087720 A1 Mar. 23, 2023

(51) Int. Cl.
*E21B 17/18* (2006.01)
*E21B 43/16* (2006.01)
*E21B 43/12* (2006.01)
*B65G 5/00* (2006.01)
*E21B 34/10* (2006.01)

(52) U.S. Cl.
CPC .............. *E21B 17/18* (2013.01); *B65G 5/00* (2013.01); *E21B 43/13* (2020.05); *E21B 43/166* (2013.01); *E21B 34/10* (2013.01)

(58) Field of Classification Search
CPC ......... B65G 5/00; E21B 43/13; E21B 43/166; E21B 34/10
See application file for complete search history.

(56) References Cited

U.S. PATENT DOCUMENTS

| | | | | |
|---|---|---|---|---|
| 2,878,165 | A | * | 3/1959 | Cottle ...................... C01C 1/10 203/99 |
| 3,806,168 | A | * | 4/1974 | McGee ................... E21B 34/16 285/123.4 |
| 4,432,417 | A | | 2/1984 | Bowyer |
| 4,949,749 | A | | 8/1990 | Fowler et al. |
| 5,141,057 | A | * | 8/1992 | Chaix ................... E21B 33/122 166/373 |
| 5,310,282 | A | | 5/1994 | Voskamp |
| 6,820,696 | B2 | * | 11/2004 | Bergman ................ E21B 43/28 166/369 |
| 7,078,011 | B2 | * | 7/2006 | Morrow .................... C01B 3/50 423/220 |

(Continued)

FOREIGN PATENT DOCUMENTS

WO 03091133 A1 11/2003

OTHER PUBLICATIONS

Notification of Transmittal of the International Search Report and the Written Opinion of the International Searching Authority, or the Declaration; PCT/US2022/076567; dated Jan. 6, 2023: 12 pages.

*Primary Examiner* — Jonathan Malikasim
(74) *Attorney, Agent, or Firm* — Cantor Colburn LLP

(57) ABSTRACT

A flow control assembly including a subassembly including an annular safety valve, a shroud, a bushing connecting the shroud to the subassembly at one of two opposing ends of the shroud, and another bushing connecting the shroud to the subassembly at the other of the two opposing ends of the shroud. The method for operating a hydrogen storage and production system including pumping hydrogen into the salt cavern for storage through a borehole and producing hydrogen from the salt cavern through the same borehole.

8 Claims, 2 Drawing Sheets

(56) References Cited

U.S. PATENT DOCUMENTS

| | | | |
|---|---|---|---|
| 7,757,784 B2* | 7/2010 | Fincher | E21B 7/20 |
| | | | 175/57 |
| 8,714,874 B2* | 5/2014 | Tunget | E21B 17/18 |
| | | | 405/59 |
| 2013/0068473 A1 | 3/2013 | Tunget | |
| 2013/0336721 A1* | 12/2013 | McBride | F17C 1/007 |
| | | | 405/55 |

* cited by examiner

FLUID STORAGE AND PRODUCTION

BACKGROUND

Salt caverns, whether naturally occurring or man made are suitable structures for storage of fluids temporarily or permanently. Commonly salt caverns are filled with brine and hence require displacement of the brine in order to use them for fluid storage. Operation that use salt caverns use two separate boreholes into the formation in order to control fluid movement and debrining operations. While this is technically feasible, it lacks efficiency. Therefore, the art would well receive alternative operations that improve efficiency.

SUMMARY

An embodiment of a flow control assembly including a subassembly including an annular safety valve, a shroud, a bushing connecting the shroud to the subassembly at one of two opposing ends of the shroud, and another bushing connecting the shroud to the subassembly at the other of the two opposing ends of the shroud.

An embodiment of a method for operating a hydrogen storage and production system including pumping hydrogen into the salt cavern for storage through a borehole and producing hydrogen from the salt cavern through the same borehole.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
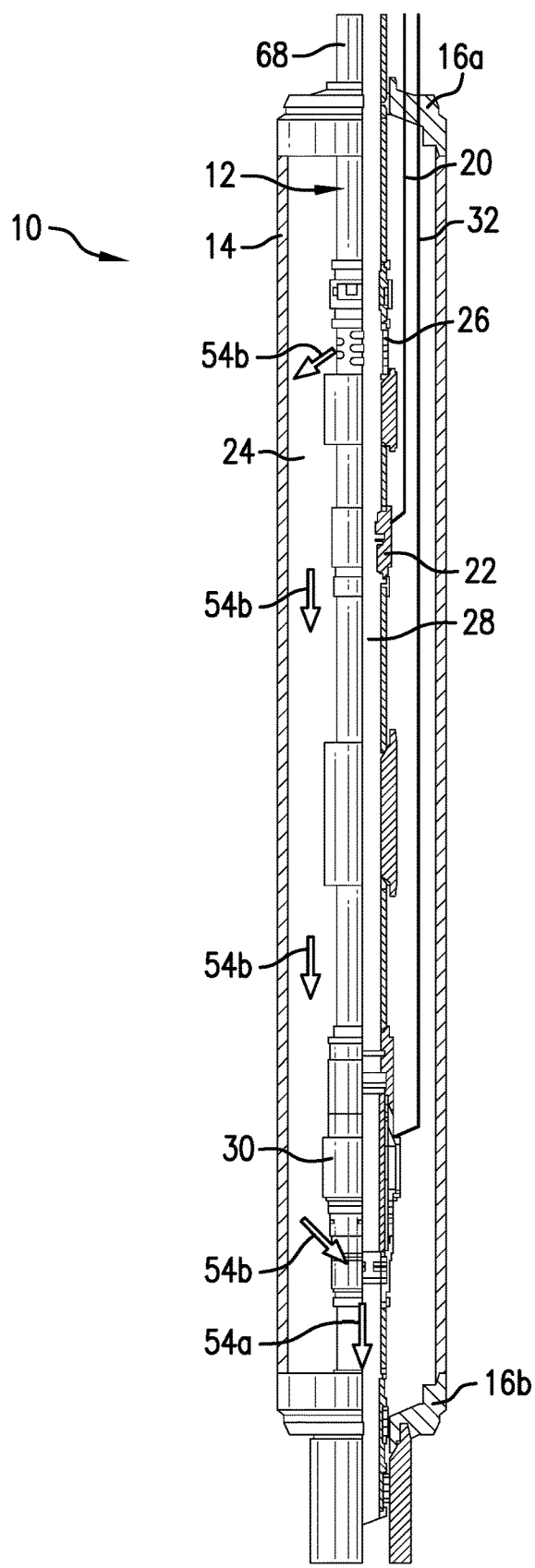
FIG. 1 is a cross section view of a flow control assembly as disclosed herein.

Referring to FIG. 1, a flow control assembly 10 is illustrated. The assembly 10 includes a tubing subassembly 12 and a shroud 14 that is disposed about the tubing subassembly 12 by multiconnection crossovers 16 at uphole (16a) and downhole (16b) ends of the assembly 10, optionally including control line passthroughs. The crossovers attach a single tubular to multiple nested tubulars as illustrated and are sometime referred to as canfield bushings. One or more control line feedthroughs are contemplated with two illustrated in the uphole bushing 16a. One of the control lines 20 feeds a ported safety valve nipple 22 such as one commercially available from Baker Hughes by product number H82750. It will be appreciated that the nipple 22 allows hydraulic fluid pressure from line 20 to reach an insert safety valve on a debrining string to be discussed hereunder. The shroud 14 is fluid tight with the subassembly 12 such that an annular fluid space 24 is created between the subassembly 12, the shroud 14 and the bushings 16. This annular space 24 is accessible by fluid from radially inwardly of the subassembly 12 through a perforated spacer tube 26, through which fluid may relatively freely flow between an ID (Inside dimension) 28 of subassembly 12 and the annular space 24. The space 24 is further accessible through an annular safety valve 30, which may in some embodiments be or be similar to Baker Hughes product number H73496. Valve 30 is controlled via control line 32. When the valve 30 is open, fluid may flow through space 24 and when valve 30 is closed, the space 24 is dead headed, thereby preventing fluid flow therethrough. Were the ID 28 occluded in a region between the tube 26 and the valve 30, flow past the subassembly 12 would occur only if valve 30 were open and would be controllable by the valve 30. In embodiments, the valve 30 is an annular safety valve as noted above and is a failsafe configuration. Alternate valves could be used such as packers with separate control lines for setting and unsetting, for example. The assembly 10 may be employed in any situation where its attributes are needed.

Figure 2:
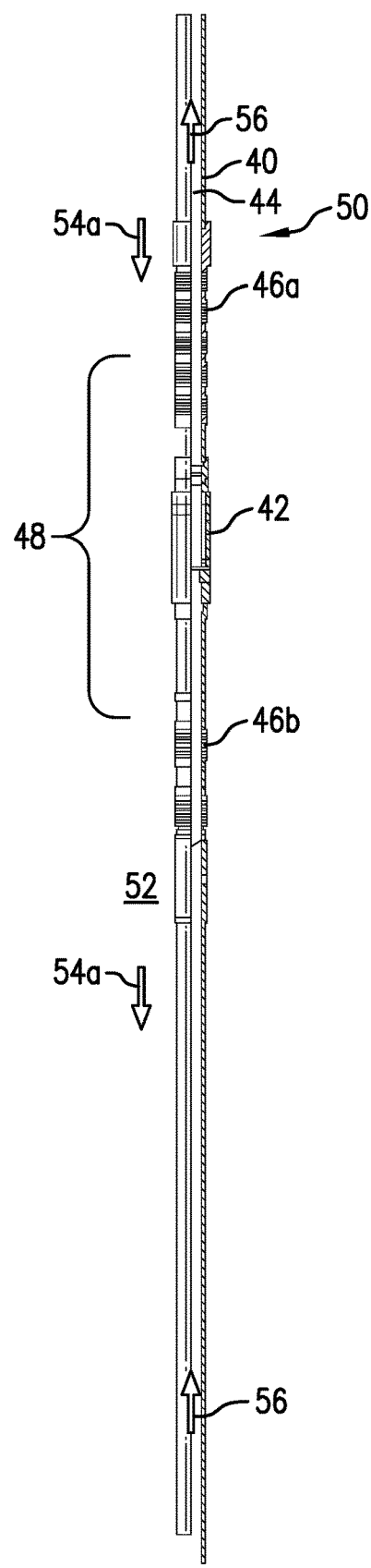
FIG. 2 is a cross section view of a debrining string configured for use with the flow control assembly of FIG. 1.

In one situation, the assembly 10 is employed with a debrining string 40, illustrated in FIG. 2. When properly nested together the assembly 10 and debrining string 40 are referred to herein as a debrining and fluid storage system 50. The string 40 includes an insert safety valve 42, such as product number H82708 commercially available from Baker Hughes. Valve 42 permits or prevents flow through an ID 44 of the debrining string 40. String 40 also includes seals 46a and 46b that straddle the valve 42 and are receivable in a sealing manner in seal bores in or adjacent nipple 22. The bracket 48 in drawing FIG. 2 provides for an understanding of the relative positioning when the debrining string 40 is disposed in the assembly 10 to create the debrining and fluid storage system 50.

Referring to FIGS. 1 and 2 simultaneously, the intent is for the reader to understand that debrining string 40 is to be disposed within subassembly 12 and at the position indicated by the bracket 48. In this position, there are flow capable structures comprising 1) the ID 44 of the debrining string 40, 2) a concentric annulus 52 formed between the string 40 and the subassembly 12, and 3) the annular space 24 in the assembly 10 (which space becomes part of a flow path including that space and the concentric annulus 52. During operation the flow of various fluids is important and is shown via arrows. Arrows 54a illustrate flow of fluid uphole and downhole of the seals 46a and b, within the concentric annulus 52 uphole of seal 46a. Arrows 54b illustrated the flow pathway from the concentric annulus 52 through the ported spacer tube 26, through space 24 and through annular valve 30 back to concentric annulus 52 downhole of seal 46b. The pathway represented by arrows 54b allows for controllability of the concentric annulus flow by interposition of valve 30. Arrows 56 illustrated a pathway flowing within the ID 44 of string 40. It should be noted that neither of these paths expose a cemented casing (not shown) that is radially outwardly disposed of the system 50 to any of the fluids being pumped through the assembly 10 in either direction.

Figure 3:
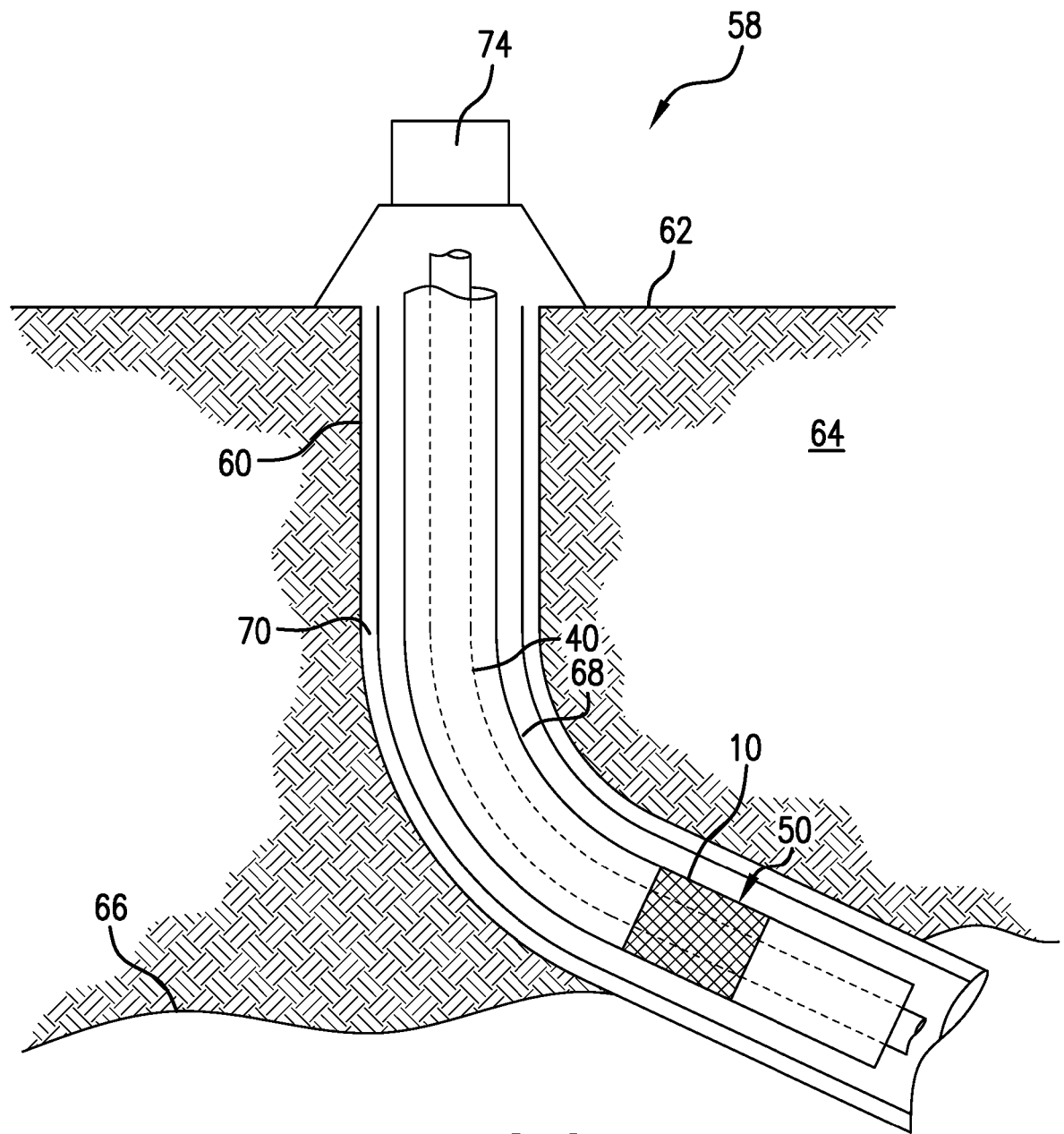
FIG. 3 is a view of a wellbore system including the flow control assembly disclosed herein.

In one use of the debrining and fluid storage system 50, the arrows 54 represent a displacing fluid such as $CO_2$ or Hydrogen that is pumped into a salt cavern formation 66 (see FIG. 3). Upon pumping the fluid into the salt cavern 66, brine within the salt cavern is displaced and flowed along the path of arrows 56 to a remote location such as the surface 62. Because the flow along 54 and the flow along 56 both include valves, which may be fail safe valves as noted above, the fluid flow in both directions is controlled. This is a requirement for hydrogen operations in some countries. Further, in the case of a hydrogen storage and production system, the hydrogen fluid is segregated from any casing of the wellbore since it is maintained within the concentric annulus 52 both during debrining of the salt cavern and when later using the formation for storage and production of hydrogen, for example.

A significant benefit of the construction of system 50 is the removability of string 40 from subassembly 12 while under pressure. It will be appreciated that there are no control lines indicated in FIG. 2. There is a safety valve 42 that requires actuation but no line running thereto. This is because the nipple 22 provides the hydraulic pressure from line 20 to the valve 42 when the string 40 is installed in the subassembly 12. This facilitates removal of string 40 while under pressure through a snubbing unit. In a hydrogen storage and production situation, for example, the ability to remove the debrining string 40 while under pressure enables the operation of a single borehole configuration for the hydrogen storage and production facility.

Referring to FIG. 3, a wellbore system 58 is schematically illustrated. The system 58 comprises a borehole 60 extending from surface 62 into a subsurface formation 64 leading to a salt cavern 66. Within the borehole 60 is a string 68 that includes the assembly 10 and may also include the string 40, which created system 50. The string 68 extends to the salt cavern 66 in order to convey fluids to and from the salt cavern 66. A cement casing 70, whether preexisting or newly created is protected from exposure to the fluid being pumped into the salt cavern 66, which can be important in the case of Hydrogen.

At surface 62 is a snubbing unit 74 to be employed for withdrawing string 40 from string 68 while under pressure, which is the case in a Hydrogen storage and production system.

Set forth below are some embodiments of the foregoing disclosure:

Embodiment 1: A flow control assembly including a subassembly including an annular safety valve, a shroud, a bushing connecting the shroud to the subassembly at one of two opposing ends of the shroud, and another bushing connecting the shroud to the subassembly at the other of the two opposing ends of the shroud.

Embodiment 2: The assembly as in any prior embodiment, further comprising a control line passthrough in one of the bushings.

Embodiment 3: The assembly as in any prior embodiment, wherein the subassembly includes a hydraulic pass-through nipple.

Embodiment 4: The assembly as in any prior embodiment, wherein the nipple includes a seal bore.

Embodiment 5: A debrining and fluid storage system including an assembly as in any prior embodiment, a debrining string having a seal disposed within the assembly.

Embodiment 6: The system as in any prior embodiment wherein the debrining string includes a safety valve.

Embodiment 7: The system as in any prior embodiment wherein the safety valve is actuated by a hydraulic pass-through nipple in the subassembly.

Embodiment 8: The system as in any prior embodiment wherein the debrining string includes two seals straddling the safety valve.

Embodiment 9: A debrining and fluid storage system including a borehole in a formation extending to a salt cavern, a string in the borehole, the string including an assembly as in any prior embodiment.

Embodiment 10: A system as in any prior embodiment further comprising a debrining string disposed within the assembly.

Embodiment 11: A method for debrining a salt cavern including pumping a fluid through an assembly as in any prior embodiment, removing brine from the salt cavern through a debrining string disposed within the assembly.

Embodiment 12: The method as in any prior embodiment, further including removing the debrining string from the assembly while under pressure.

Embodiment 13: The method as in any prior embodiment further comprising operating a snubbing unit to remove the debrining string.

Embodiment 14: The method as in any prior embodiment, further comprising isolating an environment outside of the assembly from Hydrogen.

Embodiment 15: The method for operating a hydrogen storage and production system including pumping hydrogen into the salt cavern for storage through a borehole and producing hydrogen from the salt cavern through the same borehole.

Embodiment 16: The method as in any prior embodiment wherein the pumping is carried out through a flow control assembly having a subassembly including an annular safety valve, a shroud, a bushing connecting the shroud to the subassembly at one of two opposing ends of the shroud, and another bushing connecting the shroud to the subassembly at the other of the two opposing ends of the shroud.

The use of the terms "a" and "an" and "the" and similar referents in the context of describing the invention (especially in the context of the following claims) are to be construed to cover both the singular and the plural, unless otherwise indicated herein or clearly contradicted by context. Further, it should be noted that the terms "first," "second," and the like herein do not denote any order, quantity, or importance, but rather are used to distinguish one element from another. The terms "about", "substantially" and "generally" are intended to include the degree of error associated with measurement of the particular quantity based upon the equipment available at the time of filing the application. For example, "about" and/or "substantially" and/or "generally" can include a range of ±8% or 5%, or 2% of a given value.

The teachings of the present disclosure may be used in a variety of well operations. These operations may involve using one or more treatment agents to treat a formation, the fluids resident in a formation, a wellbore, and/or equipment in the wellbore, such as production tubing. The treatment agents may be in the form of liquids, gases, solids, semi-solids, and mixtures thereof. Illustrative treatment agents include, but are not limited to, fracturing fluids, acids, steam, water, brine, anti-corrosion agents, cement, permeability modifiers, drilling muds, emulsifiers, demulsifiers, tracers, flow improvers etc. Illustrative well operations include, but are not limited to, hydraulic fracturing, stimulation, tracer injection, cleaning, acidizing, steam injection, water flooding, cementing, solution mining, etc.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited.

What is claimed is:

1. A debrining and fluid storage system comprising:
   a flow control assembly having:
      a subassembly including an annular safety valve;
      a shroud;
      a bushing connecting the shroud to the subassembly at one of two opposing ends of the shroud; and
      another bushing connecting the shroud to the subassembly at the other of the two opposing ends of the shroud;
   a debrining string having a seal disposed within the assembly, the debrining string further including a safety valve.

2. The system as claimed in claim 1 wherein the safety valve of the debrining string is actuated through a hydraulic passthrough nipple in the subassembly.

3. The system as claimed in claim 1 wherein the debrining string includes two seals straddling the safety valve of the debrining string.

4. A system comprising:
   a borehole in a formation extending to a salt cavern;
   a string in the borehole, the string including the debrining and fluid storage system as claimed in claim 1.

5. A method for debrining a salt cavern comprising:
   pumping a fluid through the debrining and fluid storage system as claimed in claim 1,
   removing brine from the salt cavern through the debrining string.

6. The method as claimed in claim 5, further including removing the debrining string from the assembly while under pressure.

7. The method as claimed in claim 6 further comprising operating a snubbing unit to remove the debrining string.

8. The method as claimed in claim 5, further comprising isolating an environment outside of the assembly from hydrogen.

* * * * *